April 15, 1952     W. J. DU PONT     2,592,874
LUBRICATING NOZZLE
Filed May 3, 1947
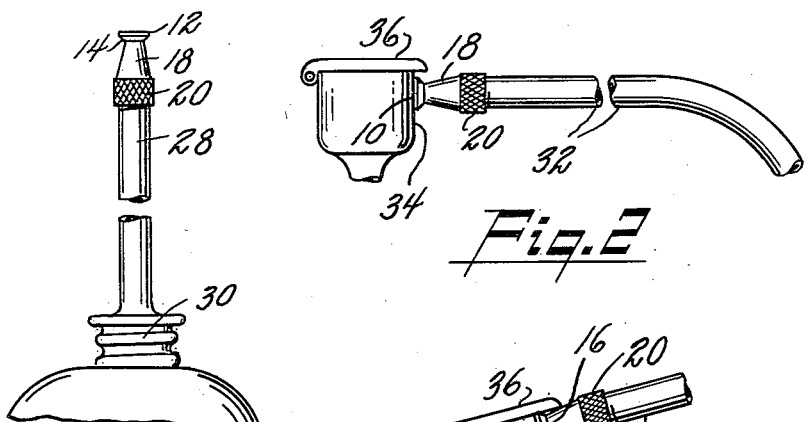
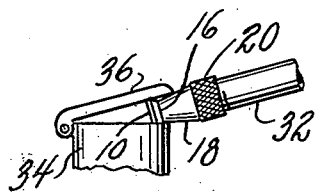
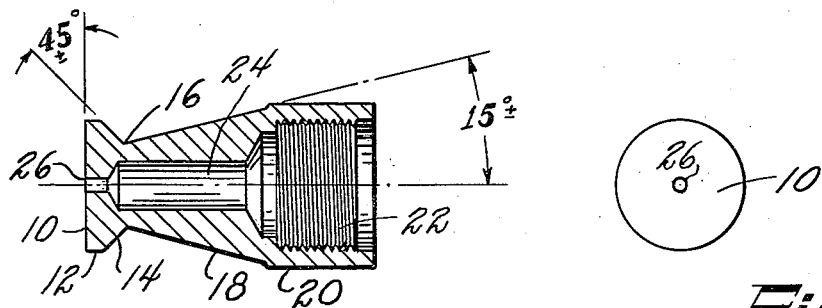
William J. Du Pont
INVENTOR.
BY Wm. O. Ballard
attorney Patented Apr. 15, 1952

2,592,874

UNITED STATES PATENT OFFICE 2,592,874

LUBRICATING NOZZLE

William J. Du Pont, Toledo, Ohio

Application May 3, 1947, Serial No. 745,699

2 Claims. (Cl. 222—566)

This invention relates to oil delivery nozzles which may be employed on the usual oiling devices such as the well-known oil can or on rigid or flexible oil ducts receiving their supply either from a nearby or a remote source.

This invention has special use on devices for delivering lubricants or dressings to belts or conveyors as shown in this inventor's patent No. 2,273,400 issued February 17, 1942, Portable Duct-Projecting Tool, and is particularly adapted for use in replenishing oil or grease cups and the like.

An object of the invention is to provide an oil delivery nozzle which may engage the cover of an oil cup from any angle, to lift the same and easily and smoothly slide thereunder to deliver a lubricant or other material thereinto.

Another object of this invention is to provide a nozzle which may be engaged by the oil cup and its cover to hold the same in delivery position until forcibly removed therefrom.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of the nozzle attached to the spout of an oil can;

Fig. 2 is a side elevation of the nozzle attached to a duct leading from a more remote source of supply, said nozzle engaging the cup preliminary to lifting the cover;

Fig. 3 is similar to Fig. 2, showing the nozzle moved to delivery position in the cup;

Fig. 4 is an enlarged longitudinal section through said nozzle; and

Fig. 5 is a plan view of the delivery face of the nozzle.

The nozzle body is preferably a unitary screwmachine product having a circular terminal delivery face 10 from which extends skirt portion 12 perpendicularly therefrom to first conical extension 14 receding or tapered inwardly to intersection 16 with second conical extension 18 enlarging or tapered outwardly from such intersection to collar 20. This intersection 16 defines the base of a substantial and definite peripheral groove or seat about the nozzle intermediate its length affording the advantages hereinafter more fully discussed.

The face 10 is preferably flat or may be concaved. The extension 12 therefrom is of appreciable thickness to prevent chipping or nicking in use and also to prevent damage to the things serviced. The conical portion 14 extends at an angle of approximately 45° therefrom. This permits sufficient sharpness to engage the underside of oil cup covers and lift the same.

The conical portion 18 extends away from the intersection 16 at about 15°. In reaching a diameter equivalent to or greater than face 10, this provides sufficient length to insure a smooth and positive operation in use. The collar 20 is knurled for easy attachment to the device on which it is to be used.

The device is provided with a duct therethrough comprising threaded portion 22, continuation 24 through the conical regions to terminate in a comparatively small orifice 26 centrally of the face 10.

The nozzle may be attached to the spout 28 of the well known oil can 30 or on a duct 32 extending from some more remote source of supply.

By having the face 10 flat or concaved, it allows the same to fully engage the side of an oil cup 34 anywhere under the perimeter of the cover 36. Then as the nozzle is moved upwardly, the rim 12 may lift the cover and through the conical sections arrangement, the nozzle easily slides into the cup from any angle and is in position for material delivery. This conical sections arrangement and design also allows the cover and cup rim to positively engage the nozzle and hold it in the cup until forcibly removed.

This is of particular value in "long range" lubrication. The nozzle stays in the cup and the material is not wasted by splashing over and around the receiver.

The face 10 and extension 12 might be called a disk of appreciable thickness from which the first conical section acutely recedes therefrom.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and it is desired to secure by United States Letters Patent:

1. In a nozzle adapted to be removably secured to the discharge spout of an oiling device, comprising a tubular body portion having an internal bore extending from one end to the other to provide a discharge orifice, one end of said bore being enlarged for being received on said discharge spout, said body portion being tapered inwardly for a portion of its length and terminating at its end in an annular disc-like flange, the outer surface of said flange being substantially flat to provide a wiping face, and the inner surface being formed conical to merge with said tapered body portion to provide a relatively sharp peripheral oil cup lid engaging edge portion, and said discharge orifice being disposed centrally of the flat outer face of said disc-like flange.

2. In a nozzle adapted to be removably secured to the discharge spout of an oiling device, comprising a tubular body having an internal bore adapted to receive said spout, said body being tapered inwardly for a portion of its length and terminating at its end in an annular disc-like flange, the outer face of said flange being substantially flat to provide a wiping surface and the inner surface of said flange being conical and merging with said tapered body portion to provide a pointed peripheral oil cup lid engaging portion, said internal bore being extended to the flat face of said disc-like flange to provide a discharge orifice therein, and said annular flange being of substantially the same diameter as the tubular body to permit easy insertion in the opening of an oil cup.

WM. J. DU PONT.

REFERENCES CITED

The following references are of record in the file of this patent:

UNITED STATES PATENTS

| Number | Name | Date |
|---|---|---|
| 359,602 | Gray | Mar. 22, 1887 |
| 881,241 | Hubbard | Mar. 10, 1908 |
| 1,781,554 | Norton | Nov. 11, 1930 |
| 1,871,824 | Richburg | Aug. 16, 1932 |